3,092,627
PROCESS FOR THE MANUFACTURE OF
18-SUBSTITUTED STEROIDS
Albert Wettstein, Riehen, and Georg Anner, Jaroslav Kalvoda, and Charles Meystre, Basel, Switzerland, assignors to Ciba Corporation, a corporation of Delaware
No Drawing. Filed July 10, 1961, Ser. No. 122,659
Claims priority, application Switzerland July 19, 1960
18 Claims. (Cl. 260—239.55)

The present invention provides a new process for the manufacture of 18-substituted steroids, more especially for the manufacture of 18-cyano compounds of the pregnane series.

Said compounds are valuable intermediates for the manufacture of 18-oxygenated pregnanes which in their turn can be used for the manufacture of compounds of the type of the adrenocortical hormone aldosterone and related substances which have an outstanding thereapeutic importance in the regulation of a disturbed mineral metabolism.

The new process consists in treating an 18-unsubstituted 20-hydroxy-20-cyano compound of the pregnane series with a compound containing a positive, monovalent halogen having an atomic weight above 19 under conditions bringing about homolytic cleavage of resulting 20-hypohalites, and if desired, the 18-cyano group in a resulting 18-cyano-20-oxo-pregnane compound is reduced to an 18-aminomethyl group, if desired after ketalization of any free oxo group that may be present.

The compound containing a monovalent, positive halogen, especially chlorine, bromine or iodine, may be e.g. an N-halogencarboxylic acid amide or imide, for example, N-chloracetamide, N-bromacetamide, N-chlorosuccinimide, N-bromosuccinimide, N-iodosuccinimide, 1,3-dibromo-5,5-dimethyl-hydantoin, or it may be chlorocyan, bromocyan or iodocyan. There may also be used hypohalous acids or derivatives thereof, e.g. alkylhypohalites, such as tertiary butylhypochlorite, tertiary butylhypobromite. Alkylhypoiodites can be prepared, for example, from heavy metal oxides, such as mercury oxide, silver oxide, lead oxide, and the like, with iodine and alcohols. There are also suitable acylhypohalites which can be obtained especially advantageously from heavy metal acylates, e.g. acetates, propionates, trifluoracetates, benzoates, etc. of metals of the first and second subgroups of the Periodic Table, e.g. from acylates of silver or mercury with chlorine, bromine or iodine. An advantageous method of preparing the acylhypoiodites consists in reacting iodine with lead tetraacetates, in which process lead diacylates and acylhypoiodites are formed. Monovalent, positive iodine is also contained in the compounds of iodine with other halogens, that is to say, in iodine chloride or iodine bromide. It is often of advantage to prepare the necessary halogen reagent, especially the hypohalite, in the reaction solution.

One way of performing the process consists in dissolving or suspending the starting material in a solvent which is inert toward the oxidant, e.g. a hydrocarbon, then adding lead tetraacetate, iodine and a weak base, for example, calcium carbonate, and heating and stirring the reaction solution at atmospheric or superatmospheric pressure. In an analogous manner the reaction can also be performed with iodine and silver acylates or iodine and mercury acylates, for example, the acetates thereof, or complexes formed from these reagents. Especially suitable solvents are saturated, cyclic hydrocarbons, such as cyclohexane, methylcyclohexane, dimethyl-cyclohexane, but aromatic hydrocarbons, such as benzene or halogenated hydrocarbons, such as carbon tetrachloride, hexachloro butadiene or mixtures of these solvents can also be used.

The reaction is conveniently performed at a raised temperature, for example, between 50 and 150° C. Moreover, it can be accelerated by irradiation of the reaction solution with visible and/or ultraviolet light. Adding free halogen, especially iodine, to the reaction solution is of advantage in many instances.

The products obtained by the present process are 18-cyano-20-oxo-pregnanes formed by the migration of the cyano group with simultaneous oxidation of the 20-hydroxyl group. This reaction of the present invention is all the more surprising as it is already known that a 20-hydroxy-pregnane containing no cyano group at carbon atom 20 yields under the specified conditions 18:20-oxido compounds and derivatives thereof.

The 20-hydroxy-20-cyano-pregnanes used as starting materials contain in the ring system more especially in one or several of the positions 1, 2, 3, 4, 5, 6, 7, 8, 9, 10, 11, 12, 14, 15, 16, 17, 21 further substituents, such as esterified or etherified hydroxyl groups, free or functionally converted oxo groups, alkyl groups such, for example, as methyl groups, or halogen atoms. The term "functionally converted oxo groups" refers to ketalized or enolized oxo groups. Furthermore, the starting materials may contain double bonds or oxido groups, for example starting from carbon atom 5 and/or in the 9:11-position. Specific starting materials are, for example, the 20-cyano-hydrins of 3-acyloxy-20-oxo-pregnanes which may be saturated or unsaturated in the 5:6-position, for example $3\beta$-acetoxy-20-oxo-$5\alpha$-pregnane, $3\beta$:$11\alpha$-diacetoxy-20-oxo-$5\alpha$-pregnane, $3\alpha$:$11\alpha$-diacetoxy-20-oxo-$5\beta$-pregnane, $3\alpha$-acetoxy-$11$:$20$-dioxo-$5\beta$-pregnane, $\Delta^5$-$3\beta$-acetoxy-20-oxo-pregnene, or 20-cyano-hydrins of $\Delta^4$-3:20-dioxo-pregnenes such as progesterone, 11-keto-progesterone, $11\alpha$-acetoxy-progesterone and the corresponding $\Delta^5$-3-ethylene-ketals.

If desired, the reaction of the invention can be followed by a functional conversion of any oxo or hydroxyl groups present, that is to say they may be ketalized, or esterified or etherified, or protected oxo or hydroxyl groups may be liberated.

The invention further provides 18-cyano-steroids, more especially 18-cyano-pregnanes, preferably such as contain in positions 3 and 20, and if desired also in positions 11 and/or 21, an oxygen function. As specific compounds there may be mentioned 18-cyano-progesterone, 18-cyano-$11\alpha$-hydroxy-progesterone, 18-cyano-$11\beta$-hydroxy-progesterone, 18-cyano-11-oxo-progesterone, and the corresponding 3-monoketals and 3:20-diketals; 3-hydroxy-18-cyano-20-oxo-pregnanes, 3:11-dihydroxy-18-cyano-20-oxo-pregnanes, 3-hydroxy-11:20-dioxo-18-cyano-pregnanes, the corresponding $5\alpha$-pregnanes, and ketals and esters thereof.

The present invention also includes 18-aminomethyl-steroids, more especially unsubstituted and substituted 18-aminomethyl-$5\alpha$- and -$5\beta$-pregnanes, preferably such as contain in positions 3 and 20, if desired also in position 11, an oxygen function. These compounds are obtained by reducing the 18-cyano compounds with a complex metal hydride, for example with lithium aluminum hydride or by catalytic reduction, preferably in an acid solution. The resulting aminomethyl compounds can be substituted, that is to say acylated or alkylated, at the nitrogen atom in the known manner. As specific examples there may be mentioned 18-aminomethyl-progesterone, 18-aminomethyl-$11\alpha$-hydroxy-progesterone, 18-aminomethyl-$11\beta$-hydroxy-progesterone, 18-aminomethyl-11-oxo-progesterone and the corresponding 3:20-diketals and derivatives acylated or alkylated at the nitrogen atom; also 3-hydroxy-18-aminomethyl-20-oxo-pregnanes, 3:11-dihydroxy-18-aminomethyl-20-oxo-pregnanes, 3-hydroxy-11:20-dioxo-18-aminomethyl-pregnanes, the corresponding $5\alpha$-pregnanes, as well as ketals, esters, N-acylated and N-alkylated derivatives thereof.

In the aforementioned esters, the acid radicals are especially those of aliphatic, cycloaliphatic, araliphatic or aromatic carboxylic acids having 1 to 15 carbon atoms, for example, formates, acetates, propionates, butyrates, trimethyl acetates, enanthates, capronates, decanoates, cyclopentyl-propionates, valerates, benzoates, furoates, hexahydrobenzoates, phenylpropionates, trifluoracetates, ethyl carbonates or methyl carbonates, etc.

The afore-mentioned compounds can be degraded to 18-oxygenated pregnanes in the following manner: The free oxo groups present in the 18-cyanides are protected by ketalization, for example by heating the compounds with ethylene glycol in the presence of a small amount of paratoluenesulfonic acid and in the ketals so formed the nitrile group is reduced, for example with lithium aluminum hydride, to form the amino group. In the 18-aminomethyl compounds this group is quaternated, for example with methyliodide in the presence of a base such as potassium carbonate, and finally the quaternary base is subjected to the degradation according to Hoffmann by being heated with an alkali or silver oxide. In this manner there are obtained 18-methylene-pregnanes in which the double bond is split either by ozonization or by oxidation with chromic acid in glacial acetic acid or by hydroxylation with osmium tetroxide and subsequent oxidative glycol splitting with per-iodic acid or lead tetraacetate. Depending on the type of oxidizing agent used there are obtained 18-oxo-pregnanes or pregnane-18-acids. The further conversion of these compounds into aldosterone and related substances follows the known pattern.

The following examples illustrate the invention.

*Example 1*

A suspension of 1.0 gram of calcium carbonate and 3.0 grams of lead tetraacetate in 100 cc. of cyclohexane is heated to 80° C. and then treated with 0.80 gram of iodine, and the mixture is boiled with stirring for 1 hour in the dark. 500 mg. of 3β-acetoxy-20-cyano-20-hydroxy-5α-pregnane are then added and the reaction mixture is refluxed for 2 to 3 hours in daylight. When the solution displays only a slightly pinkish color, it is cooled, filtered, the inorganic residue is exhaustively washed with ether, and the filtrate is successively agitated with sodium thiosulfate solution of 10% strength and water, and, without being dried, evaporated under vacuum at 30–40° C. The slightly colored, crystalline residue is washed with petroleum ether and then recrystallized from ether+petroleum ether. To decolorize the product completely it may be filtered through a column of silica gel. Yield: 284 mg. of 3β-acetoxy-18-cyano-20-oxo-5α-pregnane melting at 169–170° C. The infra-red spectrum of the compound contains inter alia absorption bands at 4.45, 5.78, 5.85, 8.06, 8.40, 8.50, 8.67, 9.75 and 10.50μ. In the NMR-spectrum the maximum associated with the C–18 methyl group at 355 cycles is absent, but maxima occur at 274, 258 and 339 cycles caused by the presence of protons of the acetate group and of the acetylmethyl C–21 and of the C–19 methyl group respectively. A shoulder at 260 cycles could be attributed to the —CH₂—CN grouping at carbon atom 18.

*Example 2*

A suspension of 4.00 grams of calcium carbonate and 18.00 grams of pre-dried lead tetraacetate in 800 cc. of cyclohexane is heated to 80° C., treated with 4.80 grams of iodine and boiled for 45 minutes in the drak. 2.00 grams of 3β:11α - diacetoxy - 20-cyano-20-hydroxy-5α-pregnane are added and the mixture is refluxed with stirring in daylight for 3½ hours. The reaction solution is cooled, filtered, the inorganic residue is thoroughly washed with ether, and the filtrate is washed with cold sodium thio-sulfate solution of 10% strength and then with water and, without being dried, evaporated under vacuum at a bath temperature of 35–40° C. Subsequent crystallization of the solid, brownish residue from methylene chloride+petroleum ether yields 1.060 gram of 3β:11α - diacetoxy-18-cyano-20-oxo-5α-pregnane melting at 211° C. which inter alia displays the following bands in the infra-red spectrum: 4.45, 5.78, 5.86, 7.35, 8.10, 8.40, 8.70, 8.86, 9.75 and 10.35μ.

*Example 3*

2.50 grams of Δ⁵-3-ethylenedioxy-20-cyano-20-hydroxy-pregnene are reacted with 22.5 grams of lead tetracetate, 6.00 grams of iodine and 5.00 grams of calcium carbonate in 1 liter of cyclohexane as described in Examples 1 and 2. Working up followed by crystallization of the crude product from methylene chloride+petroleum ether gives a 35–40% yield of Δ⁵-3-ethylenedioxy-18-cyano-20-oxo-pregnene melting at 193–196° C. The infra-red spectrum of the compound contains inter alia the following bands: 4.40, 5.86, 6.90, 7.37, 7.62, 8.25, 9.05, 9.15, 9.75, 10.10, 10.45, 10.55, 11.50 and 12.20μ.

*Example 4*

A mixture of 20.0 grams of calcium carbonate, 92 grams of lead tetraacetate, 24.0 grams of iodine and 3.5 liters of cyclohexane is boiled for 1 hour in the dark, then treated with 10.0 grams of Δ⁴-3-oxo-20-cyano-20-hydroxy-pregnene (progesterone-20-cyano-hydrin), and the whole is refluxed with stirring for 3 hours in daylight. working up as described in Examples 1 and 2 yields 12.65 grams of an oily, colored product which is dissolved in 2.6 liters of benzene, treated with 400 cc. of ethylene glycol and 1.0 gram of para-toluenesulfonic acid and ketalized for 16 hours. Usual working up yields 11–12 grams of a crude crystallizate. After recrystallization from methylene chloride+petroleum ether there are obtained 2.80 to 3.00 grams of Δ⁵-3:20-bis-ethylenedioxy-18-cyano-pregnene (18-cyano-progesterone diketal) melting at 185–186° C. in the form of fine needles. The infra-red spectrum of the compound reveals inter alia the following absorption bands: 4.42, 9.00, 9.10, 9.20 and 9.57μ.

*Example 5*

300 mg. of the Δ⁵-3-ethylenedioxy-18-cyano-20-oxo-pregnene described in Example 3 are dissolved in 100 cc. of benzene and mixed with 15 cc. of ethylene glycol and 50 mg. of para-toluenesulfonic acid, and the mixture is boiled with stirring for 16 hours with the use of a water separator. The cooled reaction mixture is poured into ice-water, diluted with ether, washed with saturated sodium bi-carbonate solution and then with water, dried and evaporated under vacuum. Recrystallization of the residue from methylene chloride+petroleum ether yields 295 mg. of Δ⁵-3:20-bis-ethylenedioxy-18-cyano-pregnene melting at 185–186° C., which is identical with the product described in Example 4.

*Example 6*

A suspension of 500 mg. of Δ⁵--3-ethylenedioxy-18-cyano-20-oxo-pregnene in 25 cc. of acetone is treated with 60 mg. of para-toluenesulfonic acid, with the starting material gradually passing into solution, and the solution is then kept for 15 hours at 20° C. The solvent is then extensively evaporated under vacuum, the residue (about 3 cc.) is taken up in ether, washed with saturated sodium bicarbonate solution and then with water, dried and evaporated, to yield 425 mg. of a colorless, oily substance. Chromatography on alumina and recrystallization from acetone+pentane yields pure 18-cyano-progesterone, melting at 134–136° C. Its infra-red spectrum contains inter alia absorption bands at 4.40, 5.86, 6.00, 6.20, 6.90, 7.40, 8.15, 8.65, 10.55 and 11.50μ.

*Example 7*

A solution of 700 mg. of 3β-acetoxy-18-cyano-20-oxo-5α-pregnane and 45 mg. of para-toluenesulfonic acid in 150 cc. of benzene and 15 cc. of ethylene glycol is boiled with stirring for 16 hours with the use of a water separator. Usual working up yields 751 mg. of crude ketal.

After two recrystallizations from methylene chloride + methanol there are obtained 558 mg. of 3β-acetoxy-18-cyano-20-ethylenedioxy-5α-pregnane melting at 170–171° C. Another 50 mg. of the same product can be obtained from the mother liquor. The infra-red spectrum of the compound reveals inter alia bands at 4.45, 5.80, 6.95, 7.30, 8.07, 8.70, 8.90, 9.00, 9.35, 9.60, 9.75, 10.40, 10.70, 11.01 and 11.35μ.

When the acetate described above is hydrolysed with potassium carbonate in methanol at 20° C., 3β-hydroxy-18-cyano-20-ethylenedioxy-5α-pregnane melting at 221–222° C. is obtained; its infra-red spectrum contains inter alia the following absorption bands: 2.75, 4.43, 6.90, 7.30, 8.25, 8.90, 9.00, 9.35, 9.65, 10.60 and 11.05μ.

*Example 8*

A solution of 500 mg. of 3β-acetoxy-18-cyano-20-ethylenedioxy-5α-pregnane in 20 cc. of absolute tetrahydrofuran is stirred dropwise with external cooling into a suspension of 500 mg. of lithium aluminum hydride in 20 cc. of tetrahydrofuran, and the reaction mixture is then refluxed for 2 hours. The excess reagent is decomposed with aqueous sulfate solution while supplying strong external cooling, and the small excess of water is taken up with anhydrous sodium sulfate. The whole is filtered, the residue is thoroughly washed with tetrahydrofuran and methylene chloride, and the filtrate is evaporated under reduced pressure, to yield 425 mg. of 3β-hydroxy-18-aminomethyl-20-ethylenedioxy - 5α - pregnane melting at 185–190° C. The infra-red spectrum of the compound contains characteristic absorption bands at 2.75, 6.30, 6.90, 7.30, 8.75, 9.35, 9.60, 9.70, 10.50, 11.30 and 11.95μ.

*Example 9*

A solution of 400 mg. of 3β-hydroxy-18-aminomethyl-20-ethylenedioxy-5α-pregnane in 10 cc. of ethanol is treated with 2.5 cc. of methyl iodide and 2.5 grams of potassium carbonate and then stirred under reflux. After 3, and after 12 hours, 2.5 cc. of methyl iodide and 2.5 grams of potassium carbonate are added and the whole is boiled for another 3 hours. The reaction mixture is filtered off to remove inorganic salts, and the latter are exhaustively washed with methanol and ethanol, and the filtrate is evaporated. The residue is repeatedly extracted by being boiled with chloroform, and the extract is evaporated under vacuum, to yield 305 mg. of amorphous methiodide of 3β-methoxy-18-dimethylamino-methyl-20-ethylenedioxy-5α-pregnane which, without having been purified, is dissolved in 20 cc. of methanol and agitated for 2 hours with a suspension of freshly precipitated silver hydroxide which has been washed until neutral. The inorganic precipitate is filtered off, the solution is evaporated under vacuum, and the residue is pyrolysed at 180–220° C. The reaction mixture is taken up in ether and water, the ethereal layer is washed with dilute hydrochloric acid and then with water, dried and evaporated under vacuum, to yield 3β-methoxy-18-methylene-20-oxo-5α-pregnane.

*Example 10*

60 g. of lead tetraacetate, dried under reduced pressure, 20 g. of calcium carbonate, and 3.5 liters of cyclohexane are boiled under reflux while being stirred for 10 minutes. When the suspension has cooled somewhat, 18 g. of iodine and 10 g. of Δ⁵-3β-acetoxy-20-hydroxy-20-cyano-pregnene are added. Heating is continued for 2 hours while irradiating with a 500 w. lamp. 2 liters of cyclohexane are then distilled off, the suspension cooled to 20° C. and treated with a solution of 50 g. of sodium thiosulfate and 30 g. of sodium acetate in 1 liter of water, and then stirred for 20 minutes. It is then diluted with 1.5 liter of a 1:1 mixture of ethanol and chloroform, stirred for another 10 minutes, and then filtered with suction. The residue is washed with 400 cc. of the ethanol+chloroform mixture and, after the addition of water, the aqueous layer is separated. The chloroform solution is washed once more with water and the aqueous solution extracted twice with chloroform. The extracts are dried with sodium sulfate and treated with 10 g. of anhydrous sodium acetate and 20 cc. of glacial acetic acid, and the whole evaporated under reduced pressure. The residue is dissolved in 100 cc. of glacial acetic acid, the solution heated on the water bath for 30 minutes, then cooled to 15° C. and agitated for 20 minutes, while gradually adding a total of 20 g. of zinc powder. The suspension is then filtered with suction, the residue washed with acetone, and the filtrate evaporated in vacuo. The filter residue is dissolved in ether, the ethereal solution washed with water, sodium bicarbonate solution, and water, and then dried and evaporated under reduced pressure. The residue (11 g.) is dissolved in methylene chloride, and chromatographed over 150 g. of silica gel (containing 7.5% of water). The first fractions eluted with methylene chloride contains some Δ⁵-3β-acetoxy-20-oxo-pregnene; they are followed by mixtures and, finally, Δ⁵-3β-acetoxy-18-cyano-20-oxo-pregnene. Yield 4.02 g. This substance is recrystallized from a mixture of acetone and isopropyl ether after which it has a double melting point in that it first melts at 137° C., solidifies again, and definitely melts at 147° C. In the IR spectrum, in methylene chloride, it shows a nitrile band at 4.5μ.

*Example 11*

5 g. of silver acetate, 4.5 g. of iodine, and 2.5 g. of 3β-acetoxy-20-hydroxy-20-cyano-5α-pregnane are covered with 200 cc. of cyclohexane. The mixture is stirred and refluxed while being irradiated with a 250 w. lamp. After 2 hours the suspension which has turned yellow is cooled, the silver salts are filtered off and washed with ether. The clear solution is washed by agitation first with sodium thiosulfate solution, then with water, dried and evaporated under reduced pressure. The residue is dissolved in methylene chloride and chromatographed over 34 g. of silica gel containing 7.5% of water. The first fractions eluted with methylene chloride contain 3β-acetoxy-20-oxo-5α-pregnane. The residue of the following fractions is recrystallized from a mixture of methylene chloride and isopropyl ether. There is obtained in this manner the 3β-acetoxy-18-cyano-20-oxo-5α-pregnane in the form of flat needles of melting point 169–170° C. The compound is identical with that described in Example 1.

*Example 12*

5 grams of mercuric acetate, 3.83 grams of iodine and 2.5 grams of Δ⁵-3β-acetoxy-20-hydroxy - 20 - cyano-pregnene are covered with 100 cc. of carbon tetrachloride. The suspension is irradiated with a 250 watt lamp while being stirred, and boiled under reflux. After 15 minutes another 1.9 grams of iodine are added and stirring is continued for 45 minutes with irradiation. The cooled suspension is then suction-filtered. The insoluble residue is washed with carbon tetrachloride, the solution agitated with 2 N-sodium thiosulfate and water, dried and evaporated under reduced pressure. The residue is dissolved in 20 cc. of glacial acetic acid and agitated for 20 minutes at 20° C. with a total of 20 grams of zinc powder added in portions. The suspension is then filtered with suction, the residue washed with acetone and the solution evaporated under reduced pressure. The solution-residue is taken up in ether. The ether solution is washed with water, dilute sodium bicarbonate solution and water, dried and evaporated under reduced pressure. The resulting 2.5 grams of residue are then chromatographed on 50 grams of silica gel (containing 7.5% of water). The first methylene chloride fractions contain derivatives containing iodine. On recrystallizing the subsequent residues of the methylene chloride fractions from isopropyl ether there are obtained 1.25 grams of Δ⁵-3β-acetoxy-18-cyano-20-oxo-pregnene having a double melting point at 137° and 147° C. The further methylene chloride and methylene chloride+acetone fractions contain amorphous products.

What is claimed is:
1. Process for the manufacture of 18-cyano-20-oxo-pregnane compounds, wherein 18-unsubstituted 20-hydroxy-20-cyano compounds of the pregnane series are heated to a temperature above 50° C. and below 150° C. with a compound yielding positive, monovalent iodine.
2. Process according to claim 1, wherein the 18-cyano group in a resulting 18-cyano-20-oxo-pregnane compound is reduced to an 18-aminomethyl group, after ketalization of any free oxo group that may be present.
3. Process according to claim 1, wherein 20-hydroxy-20-cyano-pregnane compounds are treated with compounds containing monovalent, positive iodine.
4. Process according to claim 1, wherein alkyl hypohalites are used.
5. Process according to claim 1, wherein acylhypohalites are used.
6. Process according to claim 1, wherein lead tetraacetate and iodine are used.
7. Process according to claim 1, wherein the reaction is performed in a monocyclic alicyclic hydrocarbon.
8. Process according to claim 1, wherein the reaction is performed in a lower aliphatic halogenated hydrocarbon.
9. Process according to claim 1, wherein the reaction solution is irradiated with ultraviolet light.
10. 18-cyano-progesterone.
11. Δ⁵-3-ethylenedioxy-18-cyano-20-oxo-pregnene.
12. Δ⁵-3:20-bisethylenedioxy-18-cyano-pregnene.
13. 3β-acetoxy-18-cyano-20-oxo-5α-pregnane.
14. Δ⁵-3β-acetoxy-18-cyano-20-oxo-pregnene.
15. 3β:11α-diacetoxy-18-cyano-20-oxo-5α-pregnane.
16. 3β-hydroxy-18-aminomethyl-20-ethylenedioxy-5α-pregnane.
17. A member selected from the group consisting of a compound of the formula:

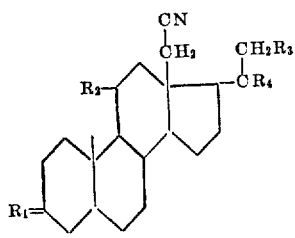

wherein R₁ represents a member selected from the group consisting of an oxo group, a ketalized oxo group, a hydrogen atom together with a hydroxy group, a hydrogen atom together with an esterified hydroxyl group, a hydrogen atom together with an etherified hydroxyl group, R₂ stands for a member selected from the group consisting of two hydrogen atoms, a hydrogen atom together with an esterified hydroxyl group and an oxo group, R₃ a member selected from the group consisting of a hydrogen atom, a hydroxyl group, an esterified hydroxyl group and R₄ for a member selected from the group consisting of a free and a ketalized oxo group, and their derivatives having a double bond starting from the 5 carbon atom.

18. A member selected from the group consisting of a compound of the formula:

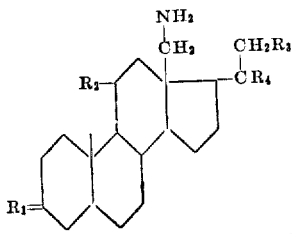

wherein R₁ represents a member selected from the group consisting of an oxo group, a ketalized oxo group, a hydrogen atom together with a hydroxy group, a hydrogen atom together with an esterified hydroxyl group, a hydrogen atom together with an etherified hydroxyl group, R₂ stands for a member selected from the group consisting of two hydrogen atoms, a hydrogen atom together with an esterified hydroxyl group and an oxo group, R₃ a member selected from the group consisting of a hydrogen atom, a hydroxyl group, an esterified hydroxyl group and R₄ for a member selected from the group consisting of a free and a ketalized oxo group, their N-alkylated derivatives, their N-acylated derivatives and derivatives of said compounds having a double bond starting from the 5 carbon atom.

No references cited.

UNITED STATES PATENT OFFICE
CERTIFICATE OF CORRECTION

Patent No. 3,092,627                         June 4, 1963

Albert Wettstein et al.

It is hereby certified that error appears in the above numbered patent requiring correction and that the said Letters Patent should read as corrected below.

Column 8, lines 17 to 26, the formula should appear as shown below instead of as in the patent:

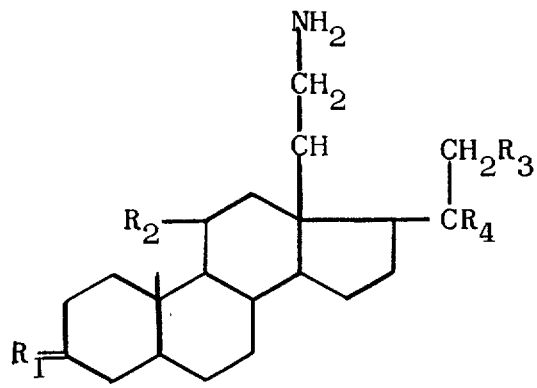

Signed and sealed this 3rd day of December 1963.

(SEAL)
Attest:
ERNEST W. SWIDER

Attesting Officer

EDWIN L. REYNOLDS
Acting Commissioner of
Patents